United States Patent [19]

Wenger et al.

[11] Patent Number: 5,730,414
[45] Date of Patent: Mar. 24, 1998

[54] REMOVABLE STORAGE ASSEMBLY FASTENING SYSTEM

[75] Inventors: Robert K. Wenger, Wooster, Ohio; Lyman B. Maynard, Oakville, Canada

[73] Assignee: The Crown Division, Wooster, Ohio

[21] Appl. No.: 638,381

[22] Filed: Apr. 26, 1996

[51] Int. Cl.⁶ ........................ B61D 45/00
[52] U.S. Cl. .............. 248/503; 410/102; 410/77; 296/63; 224/42.32
[58] Field of Search .................. 248/500, 503.1, 248/503; 296/63, 65.1; 224/42.32, 558, 550; 410/102, 77, 80

[56] References Cited

U.S. PATENT DOCUMENTS

| | | | |
|---|---|---|---|
| 637,395 | 11/1899 | Lesh | 248/503.1 X |
| 657,871 | 9/1900 | Hester et al. | 296/63 |
| 2,323,153 | 6/1943 | Pilson | 248/678 X |
| 3,399,921 | 9/1968 | Trost et al. | 410/80 X |
| 3,415,480 | 12/1968 | Sertich | 410/77 |
| 3,984,117 | 10/1976 | Bates et al. | 410/77 X |
| 5,238,285 | 8/1993 | Holdampf et al. | 248/503.1 X |
| 5,372,398 | 12/1994 | Aneiros et al. | 296/65.1 |
| 5,562,322 | 10/1996 | Christoffel | 296/65.1 |

*Primary Examiner*—Ramon O. Ramirez
*Assistant Examiner*—Stephen S. Wentsler
*Attorney, Agent, or Firm*—Oldham & Oldham CO., LPA

[57] ABSTRACT

The invention described herein pertains generally to a removable storage bin fastening system, particularly adapted for use in minivans. More specifically, the system utilizes a slidably engageable bracket which is releasably fastened to existing mounting bars in the floor of the van where the seats which normally be located, and further wherein the bracket is attached to a base plate which anchors various storage configurations. The slidably engageable bracket is secured into the striker pins either by (a) a vertical adjustment device which has a pair of opposed sides, a pivot pin between the sides, and a pair of curved surfaces at the bottom of the opposed sides and wherein the J-shaped hook cooperatively interacts through the pivotal motion of the handle through the pivot pin and curved surfaces to move up and down thereby releasing or securing the bracket by the physical contact of the J-shaped hook on the striker pin or (b) a vertical adjustment device which has a threaded J-shaped hook which is threaded at a top of the hook, and a mating pair of threads in the handle, and wherein the J-shaped hook cooperatively interacts through rotational movement of the handle to move up and down thereby releasing or securing the bracket by the physical contact of the J-shaped hook on the striker pin.

25 Claims, 4 Drawing Sheets

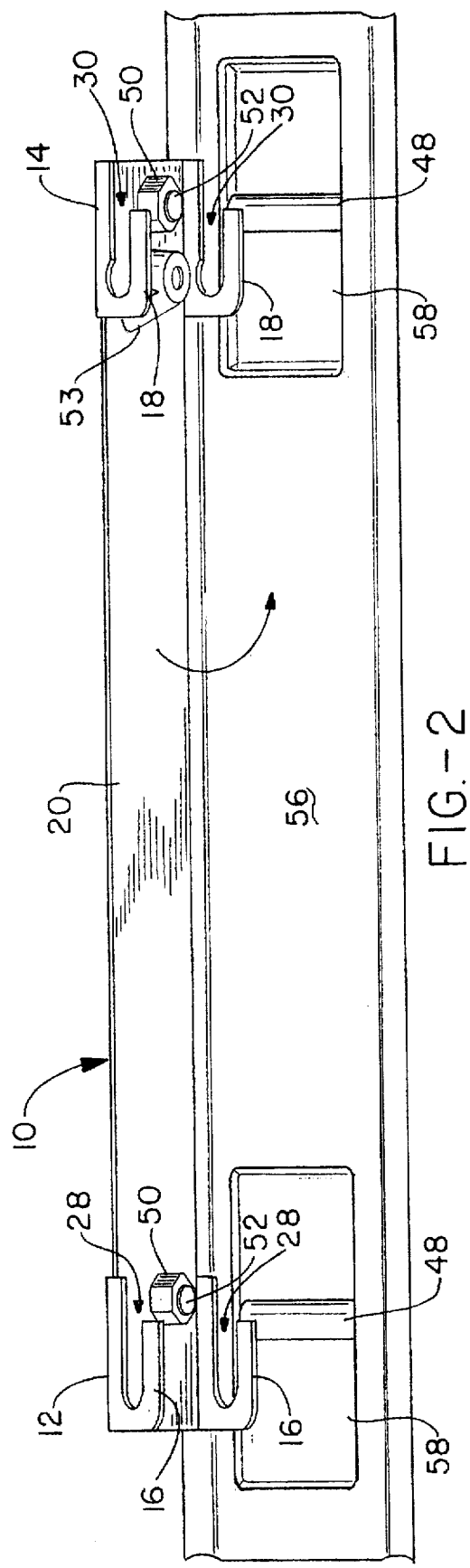
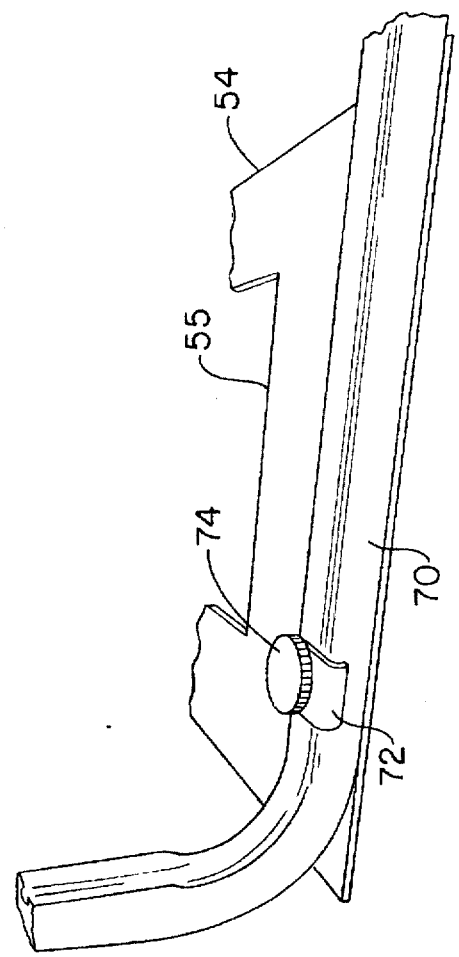

REMOVABLE STORAGE ASSEMBLY FASTENING SYSTEM

TECHNICAL FIELD

The invention described herein pertains generally to a removable storage assembly fastening system, particularly adapted for use in minivans. More specifically, the system utilizes a slidably engageable hold down bracket which is releasably fastened to existing mounting assemblies in the floor of the van where removable seats are normally located, and further wherein the bracket is attached to a base plate which anchors and positions various storage assembly configurations.

BACKGROUND OF THE INVENTION

Vehicles, in particularly van-type vehicles, have been used for many years as utility or work vehicles, wherein the rear portion of the vehicle is supplied with a variety of storage assemblies and similar equipment, for storage or sorting of a variety of parts or components. Other equipment or working materials may also be located in the rear portion of the vehicle, allowing the vehicle to be used for specialized business operations. Generally, such a utility vehicle was provided with storage assemblies or other equipment by installing such equipment into a new vehicle purchased from a manufacturer. Typically, to be converted to commercial use will not include any equipment in the rear portion of the van. Storage racks, cabinets or other equipment was then permanently fixed within the open rear portion of the van in a customized fashion for a particular commercial purpose. Although providing a vehicle which did have utility for that particular purpose, such vehicles may not be attractive for other purposes, and cannot be used effectively for personal use, to accommodate a number of passengers. Further, the permanent conversion of the van to a customized utility van requires that the storage assemblies or other equipment is fixed directly into the bottom, top and side panels of the vehicle. This operation requires that a variety of holes or other permanent alterations be made to the van, inhibiting removal of the storage assembly or other equipment and any reconfiguring of the van for another purpose.

More recently, in the area of family vehicles, minivans have significantly increased in popularity, and are now commonly used for a variety of commercial activities. Such minivans now normally include one or more removable passenger seats, which allow the minivan to be versatile in its carrying of passengers or for storage within the rear portion of the vehicle. Although versatile in allowing one or more seats to be removed from the rear portion of the minivan, use as a utility vehicle wherein a variety of storage assemblies or other equipment are secured within the vehicle would cause permanent conversion to this purpose if the storage assembly or other equipment is permanently fixed within the vehicle.

With increased popularity of minivans, and the prevalence of removable passenger seats inside the minivans, the need exists to substitute storage assemblies or other equipment in the seat locations in an easy to install manner. Minivan passenger seats typically have floor latching mechanisms, such as are described in U.S. Pat. No. 4,759,580 to Hoover Universal Inc., or in U.S. Pat. No. 5,372,398 to Chrysler Corporation and Aroma International Inc. or in U.S. Pat. No. 5,280,987 to General Motors Corp. These prior art patents describe various tracking systems with striker assemblies into which passenger seat latching mechanisms are engaged. Each striker assembly may include one or more striker pins and mounting bosses to secure each assembly to the floor of the vehicle. The present invention addresses this need by providing a customized bracket and fastening mechanism which can be used to removably mount a variety of storage assemblies or other equipment inside the van.

SUMMARY OF THE INVENTION

In accordance with the present invention, there is provided a combination assembly bracket and fastening device which permits the easy installation of removable storage assemblies or other equipment into existing tracking systems with striker assemblies into which the combination bracket and fastening device are inserted.

The assembly further provides for a quick coupling fastening device wherein only pivotal motion is required to clamp the fastening J-shaped hook onto the striker pin insider the striker assembly. Storage racks, equipment or other assemblies are selectively fastened onto a base plate which is secured to the combination assembly brackets.

The above and other objects of this invention will be evident when viewed in light of the drawings, detailed description, and appended claims.

BRIEF DESCRIPTION OF THE DRAWINGS

The invention may take physical form in certain parts and arrangements of pans, a preferred embodiment of which will be described in detail in the specification and illustrated in the accompanying drawings which form a part hereof, and wherein:

FIG. 2 is a perspective view of a seat latching mechanism of a van into which the bracket assembly and fastening device of the invention is coupled, the assembly shown tilted at right angles to the seat latching mechanism with the base plate removed for clarity;

FIG. 9 is a perspective view of the base plate as attached into a seat latching mechanism in a van, additionally showing an example of a storage assembly attached to the base plate;

DETAILED DESCRIPTION OF THE INVENTION

Figure 1:
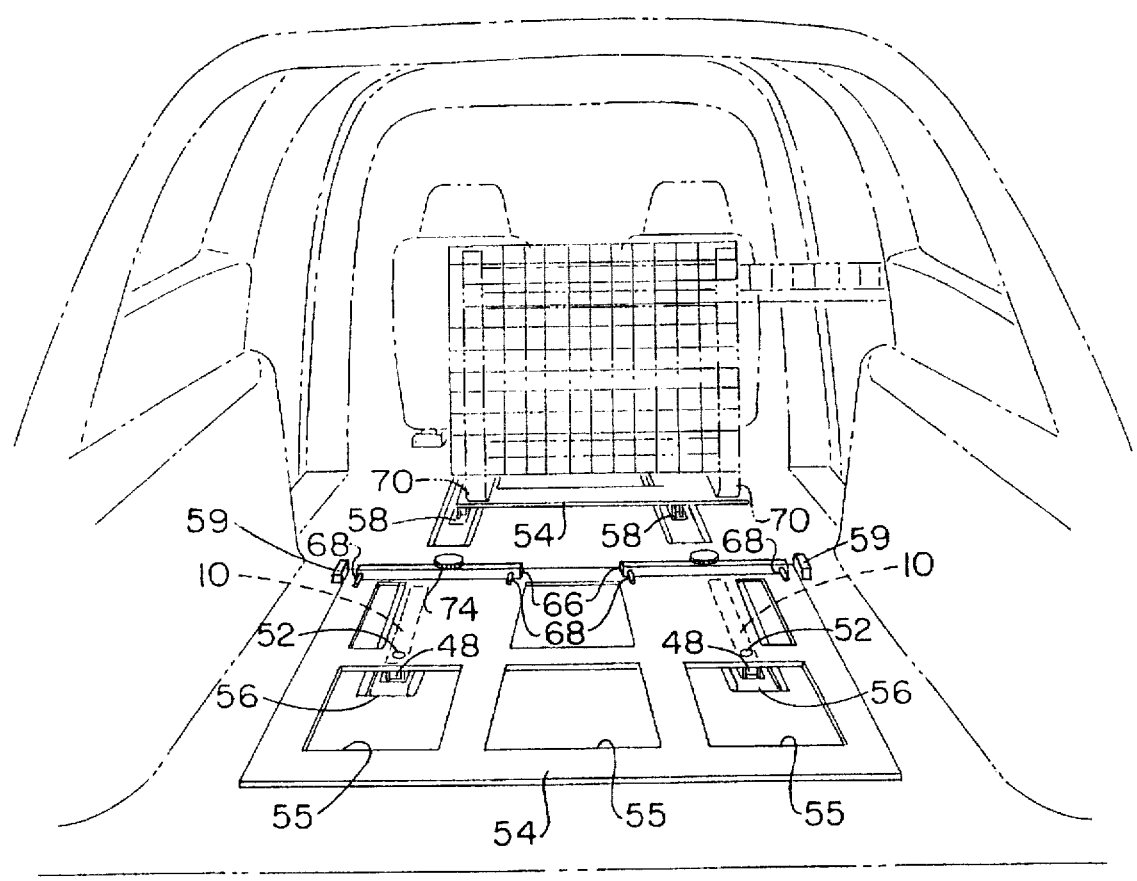
FIG. 1 is a rear view of a vehicle interior showing conversion to a utility vehicle by means of the fastening system of the invention.

Referring now to the drawings wherein the showings are for purposes of illustrating the preferred embodiment of the invention only and not for purposes of limiting the same, the Figures show a removable storage bin fastening system, particularly adapted for use in minivans. More specifically, the system utilizes a slidably engageable bracket which is releasably fastened to existing mounting bars in the floor of the van where the seats which normally be located, and further wherein the bracket is attached to a base plate which anchors various storage configurations.

The best mode for carrying out the invention will now be described for the purposes of illustrating the best mode known to the applicant at the time. The examples are illustrative only and not meant to limit the invention, as measured by the scope and spirit of the claims.

In FIG. 1, the fastening system of the invention is shown mounted within a vehicle interior. The vehicle includes a tracking system 56 having a number of striker assemblies 58 formed therein. The track system 56 allows latching of seats within the interior portion of the vehicle, with the striker assemblies 58 allowing such seats to be secured to the floor of the vehicle. These same track systems 56 and striker assemblies 58 are used in the present invention to secure the fastening system to the floor of the vehicle. In the example shown in FIG. 1, two separate fastening systems are shown, with each of the fastening systems including a base plate 54 into which a storage assembly or other equipment can be removably secured for conversion of the vehicle into a utility vehicle. One of the fastening systems is shown with a storage system or other equipment removed, and is shown to be secured in conjunction with a track system 56 and striker pin assemblies 58 including striker pins 48 therein. The base plate 54 may include one or more equipment fastening mechanisms 66 for selectively securing any type of equipment to base plate 54. As an example, the storage rack assembly shown in FIG. 1 can be positioned on base plate 54 and secured in place in conjunction with the side or rear doors of the vehicle. Although storage assemblies are one example of equipment which can be secured to base plate 54, any other type of equipment may also be removably secured thereto to allow customization of the utility vehicle for a particular purpose.

The base plate 54 is selectively secured to the bottom floor of the vehicle by means of a pair of bracket assemblies 40 which removably engage the striker assemblies 58 of the vehicle. Within each of the striker assemblies 58 is a striker pin 48. The striker assembly 58 is generally formed as a well within the floor of the vehicle, which can be positioned in conjunction with a track member 56. The striker pins 48 provide a coupling member to secure the bracket assembly 20 to the floor of the vehicle. The removable seats normally associated with such vehicles are generally coupled to a pair of striker assemblies 58 positioned in spaced apart relation to one another so that the four corners of the seat are secured to the floor. In the present invention, the fastening system may be used in conjunction with a single one of the striker assemblies 58 or a pair or multiple pairs thereof. In many applications, a pair of striker assemblies 58 will provide a stable platform for a base plate onto which a storage assembly or other equipment can be mounted. In the preferred embodiment, the bracket 10 is formed as an elongated member with two specialized ends 12 and 14 which selectively engage a striker assembly 58 to latch the bracket 10 to the floor of the vehicle. At each end 12 and 14, a downwardly extending coupling mechanism is provided, with the length of the bracket body 20 designed to correspond to the spacing between striker assemblies 58. In the preferred embodiment, the coupling members 16 and 18 comprise a downwardly extending boss comprising a pair of sidewalls extending downwardly from each side of the body 20 which include slot openings 28 and 30. The bracket assembly 10 may be positioned such that the downwardly extending bosses 16 and 18 extend into the well of the striker assembly 58 adjacent the striker pins 48. Upon sliding movement, the striker pins 48 are moved into the slots 28 and 30 such that bracket assembly 10 is retained therewith. As will be hereinafter described in more detail, the bracket assembly 10 is thereafter firmly secured to the striker pin 48 of at least one of the striker assemblies 58 of the vehicle. As also shown in FIG. 2, the bracket assembly 10 may be configured to cooperate with a pair of striker assemblies 58 positioned in front to back relationship of track 56 within the vehicle, the bracket assembly 10 may be configured to operate with a single striker assembly 58, or between striker assemblies positioned side to side within the vehicle.

Figure 3:
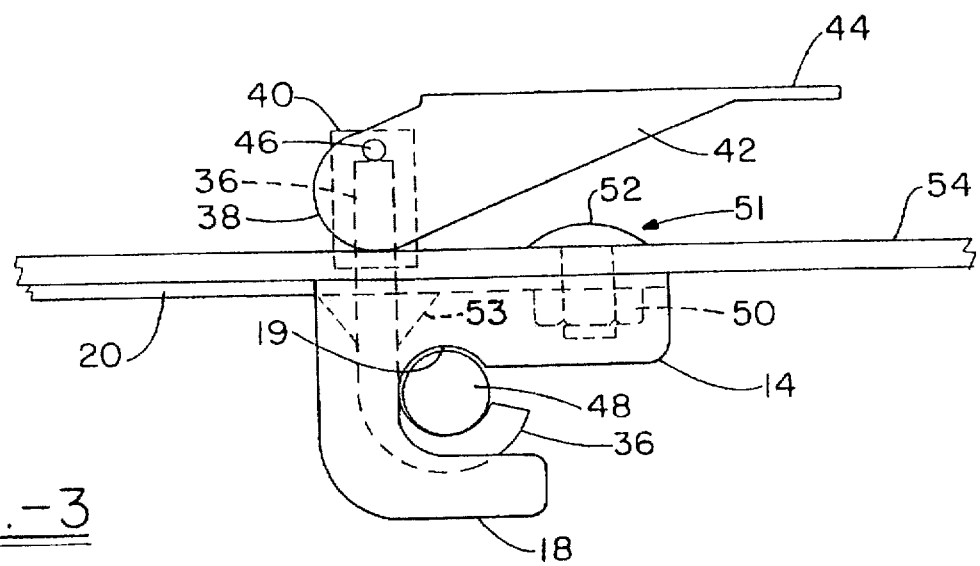
FIG. 3 side view of a portion of the bracket assembly with quick coupling fastening device.

FIG. 3 shows one embodiment of the quick coupling fastening devices used to fasten the bracket assembly 10 firmly into the striker assemblies 58 positioned within the floor of the vehicle. The quick coupling fastening device may be provided by a simple clamp member 36 adjustably positioned with respect to the bracket body 20. The clamp member 36 may be mounted in association with a handle 44 having a pair of opposed sides 42 and carrying a pivot pin 46 therebetween. Alternatively, a rotatable knob may be threaded into the bracket body 20 to carry clamp member 36, with rotation of the knob causing the clamp member 36 to be moved up and down. In the embodiment shown, the pin 46 may be supported on a pair of brackets 40, and carries the clamp member 36 therewith. In this embodiment, the handle 44, and opposed sides 42 thereof are formed with camming surfaces 38 which allow simple downward movement of handle 44 to result in tightening of the clamp member 36 onto the striker pin 48. The pivotable motion of handle 44 and resultant camming provided by surfaces 38 force supporting pin 46 to be moved upwardly and correspondingly the clamp member 36 will be engaged to striker pin 48 In the preferred embodiment, the clamp member 36 is a J-shaped hook member which positively clamps to the underside of the striker pin 48 to securely clamp the bracket assembly to the striker assembly. Also as seen in the Figure, the bracket assembly is shown secured to a base plate 54, through base plate fastening mechanism 51, e.g., a threaded bolt 52 and a mating nut 50. The quick coupling fastening device is made to support a desired amount of weight in conjunction with the base plate as previously described, and the components thereof are therefore designed to have suitable structural integrity for the designed application. Further, although one type of quick coupling fastening device is shown for firmly securing the bracket assembly in conjunction with the striker assemblies 58 and particularly with the striker pins 48 therein, other suitable securing mechanisms would be apparent to those skilled in the art, and are contemplated in the invention. Additionally, although the fastening device may be used in conjunction with a single end of a bracket assembly 10 as shown in the embodiment of FIG. 2, a suitable fastening device may be used in conjunction with each or other individual coupling ends of a bracket assembly 10.

As part of the quick coupling device, it also may be desirable to include a biasing mechanism that will facilitate uncoupling of the clamp member 36 when the bracket assembly 10 is to be removed from the vehicle. To ensure that the clamp member 36 does not get hung up on a striker assembly 58 to inhibit removal, a spring member 53 or other biasing member may be positioned to act on clamp member 36. The spring 53 will bias the clamp member 36 downwardly and/or toward the rear of the coupling mechanism or boss 18. Upon loosening of clamp member 36, the clamp 36 is moved out of engagement with striker pin 48 so as not to impede disengagement of the coupling boss therefrom.

Figure 4:
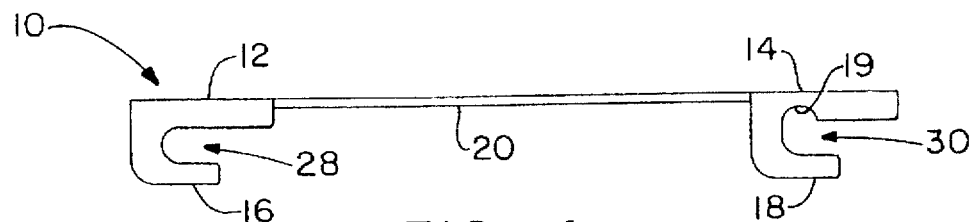
FIG. 4 is a side view of a first embodiment of the bracket assembly of the fastener.

In the preferred embodiment, the coupling boss which is used in conjunction with the clamp member 36 such as boss 18 in the embodiment FIG. 4, is also provided with a notch portion 19 within slot 30 which cooperates with the striker pin 48, when the striker pin 48 is fully inserted within the slot. The provision of notch 19 adds further to the positive engagement of the bracket assembly 10 to the striker pin 48 of striker assembly 58. In conjunction with the clamp member 36, the striker pin 48 is substantially enclosed by the clamping members. Further, the notch 19 provides an indication of when the bracket assembly is properly positioned within the striker assembly, when striker pin 48 moves into the notch portion 19.

As shown in more detail in FIG. 4, the bracket 10 may be an elongated metallic bar with specialized ends 12,14 adapted for insertion into a striker assembly for secure latching onto a striker pin contained within the striker assembly. The downwardly extending legs, 16,18 which are capable of receiving a striker pin therein via slots 28,30 contained within the ends. As shown in FIG. 2, the upper surface of the bracket 10 contains a plurality of holes. Holes 24 and 26 are for use in fastening a base plate thereto, whereas hole 22 is for fastening the bracket to the striker pin.

Figure 5:
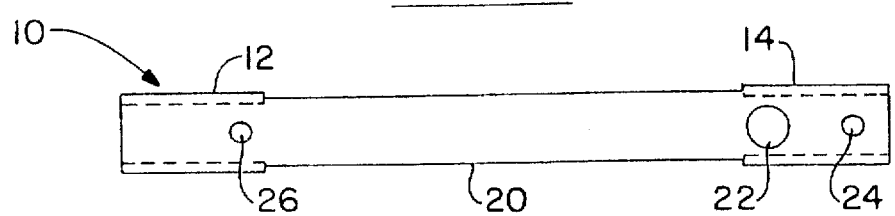
FIG. 5 is a top plan view of the bracket shown in FIG. 1.
Figure 6:
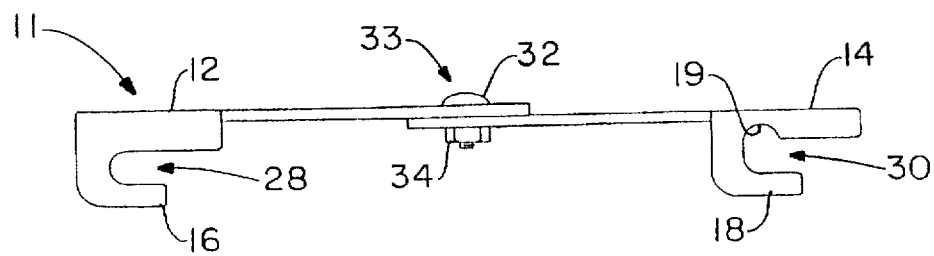
FIG. 6 is a side view of an adjustable bracket assembly.
Figure 7:
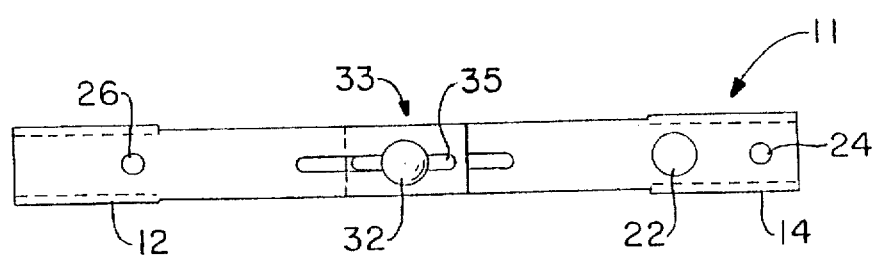
FIG. 7 is a top plan view of the bracket shown in FIG. 3.

While a solid bracket assembly is shown in FIGS. 4–5, the dimensional differences between seat coupling mechanisms between various van manufacturers makes it desirable to have an adjustment mechanism to account for different dimensions between seat striker assemblies. As seen in FIG. 6, another embodiment of the bracket comprises an adjustable split bracket 11 having first and second body members wherein each specialized end 12,14 which is adapted for insertion into the striker assembly 58 for secure latching onto a striker pin 48 contained within the striker assembly. As with the bracket 10 of the previous embodiment, each end has an extending arm, 16,18 which is capable of receiving and coupling to a striker pin via slots 28,30 or other suitable configurations positioned at the ends. In addition, an adjustment mechanism 33 allows the separate body members of the split bracket 11 to be adjusted relative to one another, thereby permitting dimensional variations in the distance between the ends 12, 14 and engaging slots 28, 30. This adjustment means may as simple as an overlapping elongated opening 35 contained within each of the bracket ends 12,14 as shown in FIGS. 6 and 7, into which the adjustment fastening mechanism is secured. The adjustment fastening mechanism shown in these Figs. is a threaded bolt 32 with mating nut 34, although suitable or equivalent fastening mechanisms are contemplated within the scope of this invention.

Figure 8:
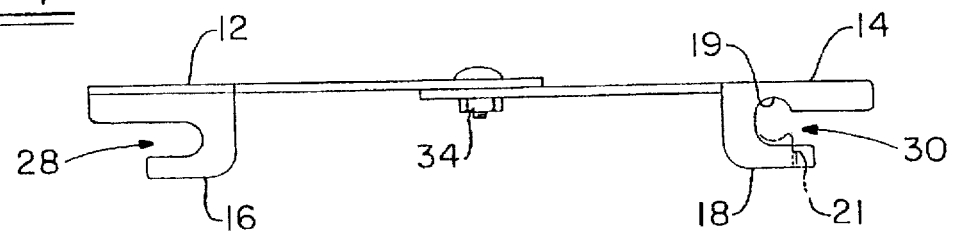
FIG. 8 is a side view of another adjustable bracket assembly, showing latching in an opposed configuration.

As shown in previous embodiments, the orientation of openings 28,30 are in the same direction. In FIG. 8, an embodiment of the invention is shown with the slots 28, 30 opposed to one another. In this embodiment, the downwardly extending bosses 16 and 18 form slots 28 and 30 in a manner wherein the boss 16 and associated slot 28 may be positioned around a striker pin 48 with the other end of the bracket assembly having boss 18 being thereafter selectively moved into position with striker pin 48 inserted into slot 30 by relative movement of the first and second body members of the bracket assembly. When properly positioned, the body members may be secured to one another by means of fastening mechanism 33. If a bracket assembly 10 having a fixed length is used, boss 18 in this embodiment, and particularly the slot opening 30, may be shaped to snap around the striker pin 48 as shown at 21, and secured thereto.

The bracket could be formed of a polymeric material, such as an extruded or molded component, allowing some resiliency in the coupling mechanism. In this embodiment, a separate clamp member associated with a coupling boss on the bracket assembly may be eliminated, with the adjustment fastening mechanism also serving as the fastening mechanism for the bracket into the striker assemblies in the floor of the van.

The base plate 54, as shown in FIGS. 1 and 9, may contain a plurality of openings 55 therein, for the purpose of making the base plate lighter, and therefore, easier to insert into the van compartment. The base plate 54 is affixed to the bracket assembly or assemblies by any suitable mechanism such as, a threadably engageable bolt 52 and mating nut 50 as shown in FIG. 1. Additionally shown in FIG. 1 in association with base plate 54 is an equipment fastening system 66. The equipment fastening system may comprise fastening pins 68, which are capable of insertion into a mating opening of an equipment frame, such as the frame of a storage drawer system. In such an embodiment, the frame of the equipment may be simply positioned with respect to equipment fastening system 66, with the opposed end of the frame secured in place to the base plate 54 by any suitable mechanism. As shown in FIG. 9, the frame 70 of the equipment could be secure at an opposed end from fastening system 66 to the base plate by means of a clamping system comprised of a knob 74 having a threaded post which can extend through frames 70 to be engaged with base plate 54. A clamp member 72 may extend around the edges of frame 72 more securely fasten frame to the base plate 54. Again, alternative equipment fastening system 66 would occur to those skilled in the art, and are contemplated within the invention, with the described embodiment being only one example of such a system. It should also be recognized that specialized mounting of particular equipment depending upon its configuration may be necessary, and is contemplated herein.

Figure 10:
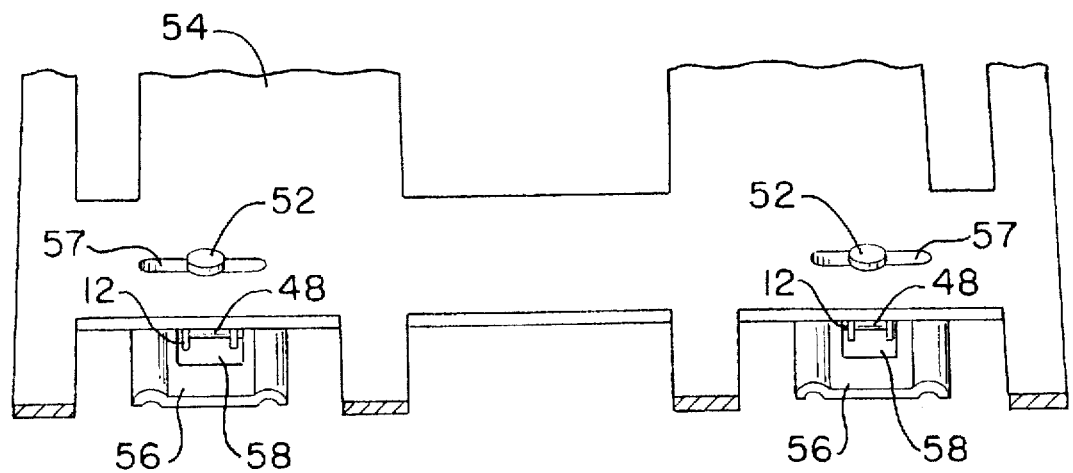
FIG. 10 is a partial perspective view of an alternative configuration of the attachment of the fastening bracket assembly to the base plate.

Turning now to FIG. 10, the side to side positioning of striker assemblies within the vehicle may also change between vehicle manufacturers or models. It is therefore desirable to provide side to side adjustment of cooperating bracket assemblies which may be used in conjunction with the striker assemblies 58 positioned in side by side relationship within the vehicle. Although previous embodiments have shown use of a bracket assembly 10 or 11 which may cooperate with front to back striker assemblies 58, this is not a restriction of the invention, and bracket assemblies cooperating with side to side striker assemblies may be used. It should be recognized that the bracket assembly 10 would be reconfigured to allow the ends to cooperate with side to side striker assemblies in a fashion similar to that described with reference to the preferred embodiments. It is also contemplated that for a variety of applications, a base plate 54 which extends between the side to side striker assemblies would be used to mount any of a variety of equipment across the entire width of the vehicle. For these applications, a pair of securing bracket members may be used in conjunction with a base plate 54, such as shown in the preferred embodiments herein, with the side to side relationship of the bracket assembly being adjustable by means of a slot 57 through which the securing mechanism 52 attaches the base plate to the bracket assembly. The slots 57 allow adjustable positioning of the bracket assembly relative to the base plate, to accommodate different widths between side to side striker assemblies within a vehicle. Again, other suitable adjustment mechanisms are contemplated, such as a bracket frame assembly extending between side to side striker assemblies, with the frame assembly being adjustable to accommodate different striker assembly configurations.

Figure 11:
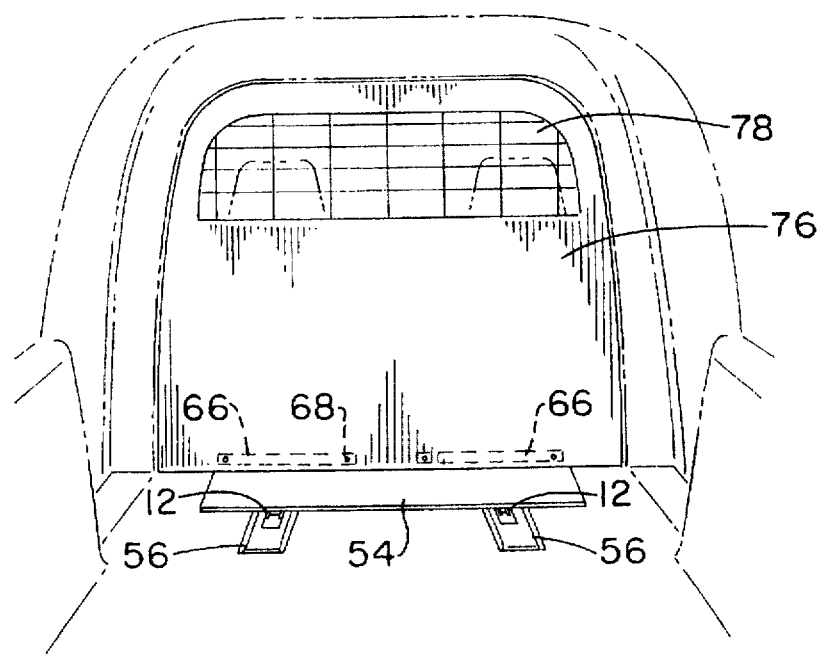
FIG. 11 is a rear view of a vehicle with the bracket assembly and fastening device showing the attachment of a protective barrier thereto.

Also as shown in FIG. 11, the equipment which can be secured to a supporting base plate 54 can vary for any particular application or use of the fastening system of the invention. In FIG. 11, a barrier system 76 may be selectively attached to the base plate 54 to provide separation between the cab of the vehicle and the rear portion thereof As seen in FIG. 1, there may be provided mounting bosses 59 for a barrier system 76, which may be integral with or selectively attached to base plate 54. The mounting bosses 59 would allow selective positioning of barrier 76 in association with base plate 54, again without any permanent modification of the vehicle. Other suitable coupling arrangements are also contemplated in the invention. The barrier system may be configured with an opening 78 to allow rear field viewing by the vehicle operator or may be constructed as a wire mesh for example,abut in any case is designed to provide a structural barrier between whatever equipment may be contained within the rear portion of the vehicle on the same or other fastening systems in accordance with the invention. Such barrier systems may be required for a particular application, and indicate the variety of equipment or components which may be selectively secured to the fastening system of the invention.

Based upon the foregoing, it should be evident that a storage system or other equipment may be selectively secured within the rear portion of a vehicle using existing striker assemblies formed in the vehicle. In this manner, the storage or other equipment is selectively positioned within the vehicle and can be removed without permanent alteration to the vehicle. The fastening system of the invention allows significantly improved flexibility of use of the vehicle, and causes no permanent deformation of the vehicle which would effect its subsequent value to another user for any desired application. Although the invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A removable fastening system for a vehicle, comprising:
   at least one elongated bracket having opposed first and second ends, and having at least one coupling boss extending from the bracket for selective coupling to a striker pin of a striker assembly in said vehicle,
   a bracket fastening mechanism positioned in association with said at least one coupling boss which is selectively engageable with said striker pin,
   a separable base plate selectively secured to said at least one bracket, said base plate providing a mounting surface for equipment to be selectively attached thereto without permanent alteration of said vehicle and allowing various base plate configurations to be selectively used in association with said bracket.

2. The system of claim 1, wherein,
   said at least one coupling boss comprises at least one sidewall member having a slot opening in one side thereof, said slot opening being configured to allow insertion of said striker pin into said slot opening, wherein said bracket fastening mechanism is capable of selectively securing said striker pin in said at least one slot opening.

3. The system of claim 2, wherein,
   said at least one slot opening further includes a notch designed to cooperate with said striker pin when said striker pin is fully inserted within said slot opening.

4. The system of claim 1, wherein,
   said bracket fastening mechanism comprises a hook member which extends from said bracket in conjunction with said coupling boss, said bracket fastening mechanism being adjustably positioned relative to said bracket so as to be selectively moveable into and out of engagement with said striker pin.

5. The system of claim 4, wherein,
   said hook member extends through said bracket and includes an adjustment handle accessible above said bracket for selectively adjusting said hook relative to said bracket.

6. The system if claim 4, wherein,
   a biasing member is provided to act upon said hook member, to bias said hook member away from said striker pin upon loosening of said hook member.

7. The system of claim 1, wherein:
   said bracket includes at least one pair of coupling bosses comprising a coupling boss at each of said first and second ends, said coupling bosses being spaced relative to one another and capable of cooperative engagement with a pair of striker pins of a pair of striker assemblies in said vehicle, each of said coupling bosses are capable of being selectively coupled to said striker pins to engage said bracket to each of said striker assemblies.

8. The system of claim 7, wherein,
   said bracket is comprised of first and second members which are selectively coupled to one another and selectively adjusted relative to one another such that the spacing between said at least one pair of coupling bosses can be selectively varied.

9. The system of claim 7, wherein
   said pair coupling bosses each comprise a at least one pair of sidewall members having slot openings in one side thereof which are configured to allow insertion of said striker pin of striker assembly therein.

10. The system of claim 9, wherein
    said slot openings in said at least one pair of coupling bosses each open toward one of said first or second ends of said bracket.

11. The system of claim 9, wherein,
    said slot openings in said at least one pair of coupling bosses each open in an opposed direction to one another toward one of said first or second ends of said bracket.

12. The system of claim 1, wherein,
    two of said brackets are used for coupling to striker assemblies which are spaced apart across the width of said vehicle, said base plate extending at least between said two brackets.

13. The system of claim 12, wherein,
    said brackets are adjustably secured to said base plate to allow the spacing between said brackets to be selectively varied.

14. The system of claim 1, which further comprises at least one mounting boss in association with said base plate to allow selective securing of equipment thereto.

15. A removable fastening system for a vehicle comprising,
    at least one bracket having at least one coupling boss associated therewith, said coupling boss extending downwardly from said at least one bracket and including a coupling mechanism capable of selective and positive engagement with a striker pin of a striker assembly of said vehicle to retain said at least one bracket in association with said striker assembly, said coupling mechanism comprising a J-shaped hook and a hook retaining means, said J-shaped hook being disposed through a hole in said bracket for engagement with the striker pin, and a base plate provided in association with said at least one bracket, said base plate providing a mounting surface for equipment to be selectively attached thereto.

16. A removable fastening system for a vehicle, comprising:

at least one bracket having opposed first and second ends, and having at least one coupling boss extending from the bracket for selective coupling to a striker pin of a striker assembly in a vehicle, said at least one coupling boss further comprising a sidewall member having at least one slot opening in one side thereof which is configured to allow insertion of said striker pin of said striker assembly therein, said slot opening in said at least one coupling boss opening toward one of said first or second ends of said bracket, a bracket fastening mechanism positioned in association with said at least one coupling boss which is selectively engageable with said striker pin, a base plate secured to said at least one bracket, said base plate providing a mounting surface for equipment to be selectively attached thereto without permanent alteration of said vehicle.

17. The system of claim 16, wherein, said bracket fastening mechanism is capable of selectively securing said striker pin in said at least one slot opening.

18. The system of claim 17, wherein, said at least one slot opening in said at least one coupling boss further includes a notch designed to cooperate with said striker pin when said striker pin is fully inserted within said slot opening.

19. The system of claim 16, wherein, said bracket fastening mechanism comprises a hook member which extends from said bracket in conjunction with said at least one coupling boss, said bracket fastening mechanism being adjustably positioned relative to said bracket so as to be selectively moveable into and out of engagement with said striker pin.

20. The system of claim 19, wherein, said hook member extends through said bracket and includes an adjustment handle accessible above said bracket for selectively adjusting said hook relative to said bracket.

21. The system of claim 19, which said bracket fastening mechanism further comprises a biasing member acting upon said hook member to bias said hook member away from said striker pin upon loosening of said hook member.

22. The system of claim 16, wherein, a pair of coupling bosses are provided with said at least one bracket and said at least one bracket is comprised of first and second members which are selectively coupled to one another and selectively adjusted relative to one another such that the spacing between said pair of coupling bosses can be selectively varied.

23. The system of claim 16, wherein, two of said brackets are used for coupling to striker assemblies which are spaced apart across the width of said vehicle, said base plate extending at least between said two brackets.

24. The system of claim 23, wherein, said base plate is a separate component which is selectively secured to each of said brackets, wherein said brackets are adjustably secured to said base plate to allow the spacing between each of said brackets to be selectively varied.

25. The system of claim 16, which further comprises at least one mounting boss in association with said base plate to allow selective securing of equipment thereto.

* * * * *